Aug. 5, 1958     J. CHADDERDON     2,846,193
MILLING CUTTER FOR USE IN OIL WELLS
Filed Jan. 7, 1957
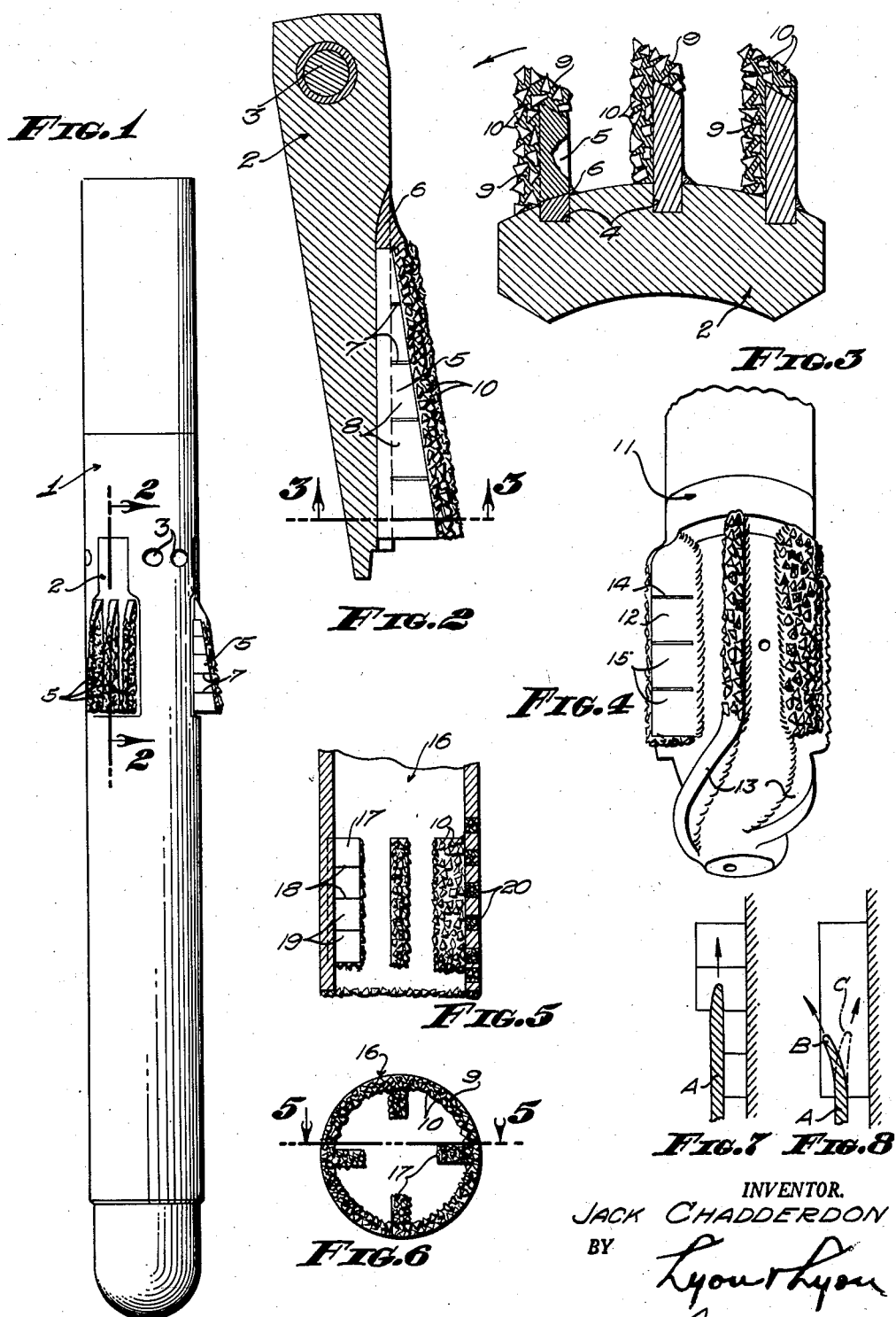
INVENTOR.
JACK CHADDERDON
BY
Lyon & Lyon
ATTORNEYS United States Patent Office 2,846,193
Patented Aug. 5, 1958

2,846,193
MILLING CUTTER FOR USE IN OIL WELLS
Jack Chadderdon, Palos Verdes Estates, Calif.
Application January 7, 1957, Serial No. 632,932
8 Claims. (Cl. 255—73)

This invention relates to a milling cutter for use in oil wells, and included in the objects of this invention are:

First, to provide a milling cutter for use in oil wells which comprises a load-carrying member covered on its work-engaging surfaces with a matrix, in which is embedded cutting elements in the form of cemented carbides.

Second, to provide a milling cutter for use in oil wells which may be mounted as a fixed longitudinally extending cutting rib internally or externally of a tubular body structure or mounted on movable arms, for use as cutting elements of an expansible milling tool.

Third, to provide a milling cutter for use in oil wells wherein a rib core is covered at its radially extended edge and at least one side face with a matrix in which is bonded and embedded a plurality of cutting elements formed of cemented carbide fragments.

Fourth, to provide a milling cutter for use in oil wells wherein the rib core is formed of material which is capable of wearing away as the milling operation proceeds, and which is divided into segments so arranged that in the course of milling an annular member the axial depth of groove worn in the cutter is limited essentially to a single segment, thereby preventing a progressive increase in frictional resistance beyond a predetermined point, so that the milling operation is not impaired, and permitting the entire length of the milling cutter to wear away before renewal of the cutter is needed.

With the above and other objects in view, as may appear hereinafter, reference is directed to the accompanying drawings in which:

Figure 1 is a side view of an expansible milling cutter with the milling teeth shown in their expanded position;

Fig. 1 is an enlarged longitudinal sectional view through 2—2 of Fig. 1 showing one of the milling cutters and its supporting arm;

Fig. 3 is a further enlarged transverse sectional view through 3—3 of Fig. 2;

Fig. 4 is a fragmentary perspective vew of a modified form of milling cutter with fixed external cutter teeth;

Fig. 5 is a fragmentary sectional view through 5—5 of Fig. 6 showing a tubular milling cutter with fixed internally directed teeth;

Fig. 6 is an end view of the milling cutter shown in Fig. 5;

Figs. 7 and 8 are diagrammatic views, illustrating the effect obtained by dividing the milling cutter core blades into segments.

Reference is first directed to Figs. 1, 2, and 3. The construction here shown is an expansible mill which is disclosed in more detail in my copending application Serial No. 632,931 filed January 7, 1957, for Expansible Mill for Well Casing.

This application is directed to the cutting elements per se and the internal mechanism of the mill as a whole to effect operation, and contraction of the cutters is not involved. Thus, for the purposes of the present application, there is provided a body structure 1 in which is mounted a set of expansible cutter arms 2, the upper ends of which are supported by bearing shafts 3 journaled transversely in the body structure 1.

The lower or depending ends of the cutter arms 2 are widened and provided with longitudinally extending grooves 4. Three such grooves are shown. Each groove receives a cutter core blade 5 which is welded or brazed in place, as indicated by 6. The welding is so applied that the welding material may be melted to remove used cutter core blades or machined to free the blades, as desired.

Each cutter core blade 5 is largest at its lower end and diminishes in height towards its upper end. In addition, the radially protruding portion of the blade is divided by slots 7 into a plurality of segments 8; also the radially outer edges of the blades are bevelled.

The radially outer edges of the blades 5 and the leading sides thereof, that is, the sides facing in the direction of rotation of the tool, are covered with a matrix 9 in which is embedded a large number of cutting elements or fragments 10.

The cutting elements 10 are cemented carbide particles which have been shattered or formed into the desired shapes and selected as to size. Cutting fragments varying from $3/64''$ to $1/4''$ are satisfactory. Each cutting element comprises a plurality of carbide grains bonded by a cementing material, usually cobalt. A representative list of the cemented carbides which may be used include the carbides of tungsten, molybdenum, chromium, vanadium, zirconium, titanium, uranium, tantalum, and niobium (columbium).

It is preferred to use for the cutting element a cemented carbide particle having a Rockwell "A" hardness of 85 and above. Many of the commercially available cemented carbides are satisfactory. The principal commercial carbides are tungsten carbide in a binder of cobalt, or alloys comprising principally tungsten carbide with varying percentages of other carbides with cobalt as the principal binder.

In the use of cemented tungsten carbide or its alloys, it is essential to use mono-tungsten carbide (WC) as distinguished from di-tungsten carbide ($W_2C$). $W_2C$ is extremely brittle and does not bond well, but instead is believed to form with the cobalt binder a brittle compound (possibly $W_2CCo_2$), and therefore has poor shock resistance. It readily shatters and fails to maintain a cutting edge. Its presence, even in comparatively small amounts, detracks from the quality of the cemented carbide.

Conversely, WC has the desired hardness, and especially when properly bonded or cemented with cobalt or other appropriate bonding alloys of cobalt exhibits superior shock resistance. When WC is heated to its melting point it decomposes into graphite and a liquid, the composition of which is not certain. This liquid solidifies as a mixture of WC and $W_2C$ with inclusions of the graphite formed when melted. It is therefore important that cemented carbides be used as opposed to cast carbides.

It is desirable in mounting the cutting elements that the temperature be maintained below the melting point of the binder, in order to avoid injurious grain growth of the carbide grains and/or injurious dilution of the cementing material with the matrix. Thus a matrix is selected which has a melting point in the range between 1600° and 2450° F. and therefore comfortably below the melting point of the binder (2728° F. for cobalt).

A wide range of matrix, alloys, and compositions are suitable. Representative matrix materials include pure copper, copper-zinc alloys, copper-nickel alloys, copper-zinc-nickel alloys, copper-silicon alloys, and more complex alloys of copper which may include manganese, tungsten, iron, silver, cadmium, beryllium, cobalt, and other alloy metals of varying amounts. Also, many of the commercially available nickel-chromium-boron alloys are satisfactory.

The desirable properties for the matrix 9 are that the melting point be below that of the carbide binder; that the matrix wets the cemented carbide particles or cutting fragments 10; and that the matrix be tough, resilient, ductile, and wear-resistant so as to provide a good shock barrier or shock cushion for the cemented carbide particles or cutting fragments.

While it is desirable to avoid undue heating of the cemented carbide fragments, it is also desirable to maintain the matrix in a fluid state for a period of time to effect intergranular penetration of the matrix into the binder. This may be accomplished at the time the matrix and cutting fragments are bonded to the blades 5, or may be accomplished previously by casting the cutting fragments 10 and matrix 9 together to form a rod or bar which may be used in the manner of a welding rod to lay the matrix and cutting fragments on the surfaces of the cutter core blades 5; in doing so, appropriate commercial fluxes may be used to ensure a firm bond between the matrix and the core blades.

Reference is now directed to Fig. 4. In this construction, radially outwardly directed fixed cutting teeth are shown. More specifically, a tool body 11 is provided on which are welded a plurality of cutter core blades 12 similar to the blades 5, except that in this case the blades are shown as uniform in radial width. Also some of the blades merge into pilot ribs 13 of lesser radial depth to guide the nose of the tool into an annular member, such as tubing or casing, which is to be milled.

As in the first described structure, the blades 12 are provided with slots 14 to divide the blades into a series of segments 15. The radially outer edges and the leading sides of the blades 12 are provided with a matrix coating 9 and cutting fragments 10.

Reference is now directed to Figs. 5 and 6. In this construction, an annular or tubular body member 16 is shown which is provided with a series of radially inwardly directed cutter core blades 17. These may be welded in the same manner as the previously described structures, and are divided by slots 18 into a series of segments 19.

In the construction shown in Figs. 5 and 6, the walls of the annular or tubular body member 16 are provided with a multiplicity of perforations which are filled with matrix and cemented carbide fragments 20. This specific construction has been made the subject of another patent application Serial No. 632,930 filed January 7, 1957 by Robert G. Owen for "Annular Mill for Use in Oil Wells."

The internal blades 17 are covered on their radially inner edges and leading sides with the matrix coating 9 containing the cemented carbide cutting fragments 10.

Operation of the milling cutter is as follows:

In each of the constructions illustrated, the tool on which the cutters are mounted is rotated in a direction so that the face of each core blade 12, 5, 17 bearing the cutting fragments constitutes the leading face. The tool in its various forms shown is intended primarily to mill well casing or drill pipe or tubing by engaging the end thereof.

In the case of the construction shown in Figs. 1 through 3 and in Fig. 4, the lower end of the tool below the cutting blades comprising the core blades 12, matrix 9, and cutting fragments 10 enters into the casing or the like and guides the tool in its operation so that the end of the casing is milled. In the course of such operation, the cutting blades wear away exposing fresh cutting fragments. Due to the presence of the cutting fragments, the attrition of the blades is very much lower than the attrition of the casing or other workpiece within the hole engaged by the tool.

With regard to the construction shown in Figs. 5 and 6, the tubular body 16 may fit over the drill string, or other fish contained in the well, so that the principal milling operation is accomplished by the internal ribs. However, the body itself with its cutting fragment-filled perforations also functions in case portions of the oil well "fish" project radially from the main body of the fish. For example, the fish may be a tool bit or reamer with projecting cutters. In this regard, it should be noted that the tungsten carbide fragments are capable of milling even the hardened cutting elements of rotary well tools.

Another use of the milling cutter, particularly the type shown in Fig. 4 but with the pilot end omitted, is the milling of a window in the side of a well casing with the cooperation of whipstock.

Reference is now directed to Figs. 7 and 8. Each of the cutting blades have been disclosed as provided with a series of slots to divide the cutting blades into a series of segments. The slots may be filled with the matrix, or only partially filled with matrix, or be free of matrix. The purpose of these slots or slits is to permit the radially outer portion of each segment (or radially inner portion, as the case may be) to break free as the blades wear away, as indicated in Fig. 7. This permits use of cutting blades having a substantial longitudinal dimension.

In the end milling of a casing, such as the casing A shown in Figs. 7 and 8, the cutting rate on the casing, or the attrition rate of the cutter, is not the same for the radially inner and radially outer portions of the casing wall. For example, particularly with the type of mill shown in Fig. 4, the end of the casing tends to flare as indicated by B in Fig. 8. This may be due in part to lateral pounding of the pilot end of the mill within the casing. On the other hand, the mill shown in Fig. 1 tends to cause the upper end of the casing to swage inwardly as indicated by C in Fig. 8. In either case, whether the upper end of the casing tends to swage inward or flare outward and a solid blade is used, the friction increases and the cutting action decreases until a point is reached (roughly, when the depth of the slot in the milling cutter is five to ten times the wall thickness of the casing) where further cutting becomes impractical. This requires removal of the tool and replacement of the cutting blades.

If the length of casing or tubing milled is not unduly great, this is of no consequence. In fact, it is possible to mill from ten to fifty feet of casing, depending on the size and grade, without undue difficulty. However, in the milling of high strength casing or drill pipe, this condition becomes quite unsatisfactory.

By slitting the cutting blades, as indicated in the drawings, the radially outer portion of each segment drops away as the segment is severed so that the milling operation may continue until the entire cutting blade has been destroyed. Although there may be a slight inturning of the casing as it reaches the extremity of one segment, the presentation of a free segment tends to correct this condition, so that the movement of the end of the casing as the blade segments wear away is in the direction of the arrow B in Fig. 7, that is, parallel to the axis of the casing and tool.

Thus by extending the length of the cutting blades comprising the segmental core blade with its matrix and cutting fragment coating, it is possible to mill several hundred feet of casing or drill pipe, should this be required.

In each of the constructions illustrated, the cemented carbide particles are bonded to and supported by the matrix. The matrix, in turn, is bonded to and supported by the core blade. Thus a rigid, high strength support is afforded, which enables each cutting fragment to perform its cutting action until the fragment has become completely worn away.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A milling cutter for use in oil wells, comprising: a body structure; a longitudinally extending core blade secured thereto and protruding radially therefrom, said core blade being divided transversely into a plurality of segments, said core blade being capable of wearing away when subjected to attrition to expose succeeding segments; a covering of a matrix bonded to at least one side and the radially extended edge of said core blade; and a plurality of cutting elements embedded in and bonded to said matrix.

2. A milling cutter for use in oil wells as set forth in claim 1, wherein: a plurality of core blades are mounted on a common arm connected to said body structure for limited radial movement.

3. A milling cutter for use in oil wells as set forth in claim 1, wherein: said core blades are fixed directly to said body structure and are mounted externally thereof.

4. A milling cutter for use in oil wells as set forth in claim 1, wherein: said body structure is tubular and said core blades are fixed directly to the radially inner walls of said body structure and extend radially inwardly therefrom.

5. A milling cutter, comprising: a support member arranged for rotation about a longitudinal axis in a preselected direction; an elongated core blade disposed longitudinally on said support member and extending radially therefrom, said blade having a plurality of transverse radially extending slits dividing said blade into a longitudinally extending series of segments; a multiplicity of cutting elements disposed on the leading side surface and the radially extended surface of said core blade; and a matrix bonded to said core and cutting elements; said core and matrix forming a support for said cutting elements but having less attrition resistance, thereby to wear away as said blade is rotated in axially bearing relation with a workpiece and expose said cutting elements in succession.

6. A milling cutter as set forth in claim 5, wherein: said support member includes a body structure and a depending arm having limited pivotal movement to move the lower end thereof radially from said body member, and said core blade is secured to said arm.

7. A milling cutter as set forth in claim 5, wherein: a plurality of said core blades are rigidly attached directly to and extend radially outwardly from said support member.

8. A milling cutter as set forth in claim 5, wherein: said support member is tubular and a plurality of said core blades are rigidly attached directly to the radially inner wall of said support member and extend radially inwardly therefrom.

References Cited in the file of this patent

UNITED STATES PATENTS

| | | |
|---|---|---|
| 2,088,025 | Church | July 27, 1937 |
| 2,255,435 | Newton | Sept. 9, 1941 |
| 2,740,651 | Ortloff | Apr. 3, 1956 |

FOREIGN PATENTS

| | | |
|---|---|---|
| 722,529 | Great Britain | Jan. 26, 1955 |